United States Patent
Kolton et al.

(10) Patent No.: US 8,683,724 B2
(45) Date of Patent: Apr. 1, 2014

(54) ID TAG FOR CIRCUIT BREAKER

(75) Inventors: Chester Kolton, Westfield, NJ (US); Michael Norman, East Brunswick, NJ (US); Jake Strassburger, South Plainfield, NJ (US); Alex Tetiyevsky, Springfield, NJ (US)

(73) Assignee: B&G Plastics, Inc., Newark, NJ (US)

( * ) Notice: Subject to any disclaimer, the term of this patent is extended or adjusted under 35 U.S.C. 154(b) by 116 days.

(21) Appl. No.: 13/543,003

(22) Filed: Jul. 6, 2012

(65) Prior Publication Data

US 2013/0008068 A1    Jan. 10, 2013

Related U.S. Application Data

(60) Provisional application No. 61/504,938, filed on Jul. 6, 2011.

(51) Int. Cl.
*B65D 85/00* (2006.01)
*H01H 9/18* (2006.01)

(52) U.S. Cl.
CPC ...................................... *H01H 9/18* (2013.01)
USPC .............................................. 40/672; 206/701

(58) Field of Classification Search
CPC .................................. H01H 9/18; H01H 71/04
USPC ................................... 40/672, 661.06, 661.08
See application file for complete search history.

(56) References Cited

U.S. PATENT DOCUMENTS

| | | | |
|---|---|---|---|
| 7,257,916 B2 * | 8/2007 | Hall et al. | 40/672 |
| 7,995,314 B2 * | 8/2011 | Titus | 361/42 |
| 2001/0054960 A1 * | 12/2001 | Kolton et al. | 340/572.8 |
| 2003/0173360 A1 * | 9/2003 | Rack et al. | 220/23.4 |

* cited by examiner

*Primary Examiner* — Kristina Junge
(74) *Attorney, Agent, or Firm* — Hoffman & Baron, LLP

(57) ABSTRACT

A tag for attachment to a circuit breaker is formed from a sheet of plastic material having first and second notches, one or more catches corresponding to one or more apertures, an electronic security device and a plurality of parallel grooves extending between the edges to form a plurality of sections. The tag is assembled by folding the sheet of plastic material so that the end sections overlap and the apertures fixedly receive the catches to secure the tag in a closed position. The notches in the first and second top sections form an opening, which is adapted for receiving the circuit breaker switch.

19 Claims, 3 Drawing Sheets

ID TAG FOR CIRCUIT BREAKER

This application claims priority from provisional application Ser. No. 61/504,938, filed on Jul. 6, 2011, which is incorporated herein in its entirety.

FIELD OF THE INVENTION

The present invention relates generally to tags attached to electrical devices. More particularly, the present invention relates to a tag that may be applied to a circuit breaker.

BACKGROUND OF INVENTION

Electronic tags attached to articles have a wide variety of uses, including tracking, inventory control and security. These electronic tags can also provide electronically readable information pertaining to the articles.

These tags or markers may include radio frequency identification (RFID) tags or electronic article surveillance (EAS) tags. EAS tags may be used with an alarm system to provide theft deterrence by monitoring the location of the tags and any unauthorized movement of the article containing the EAS tag from a predetermined area. The tags can be enclosed in or attached to a variety of different devices, such as holders or housings, which accommodate the electronic tag and are used to attach the tags to articles. The tags are secured to the article so that they remain with the article until after the time of purchase.

With respect to electrical devices, such as circuit breakers, various housings have been developed to secure the tag to different locations on the devices. The flat surfaces of a circuit breaker and the absence of any apertures make it difficult to attach tags and difficult to retain the tag thereon, as the tag housing can normally be removed by sliding it off the smooth sides of the circuit breaker.

It is therefore desirable to provide a tag housing which may be secured to the outside surface of a circuit breaker and can not be readily removed therefrom.

SUMMARY OF THE INVENTION

In accordance with the present invention, a tag for attachment to a circuit breaker is provided, wherein the circuit breaker has a substantially rectangular body with a top side, a bottom side, two side walls, two opposing ends, and a switch extending from the top side. The tag includes a sheet of plastic material having a plurality of parallel grooves, first and second notches, one or more catches and one or more apertures and an electronic security device. Preferably, the sheet of plastic material is substantially rectangular and substantially flat. The sheet of plastic material has a thickness, an interior surface, an exterior surface, a first side edge, a second side edge, a first end and a second end. The plurality of parallel grooves extends between the first and second side edges on the interior surface of the sheet of plastic material. Preferably, each of the plurality of parallel grooves has a depth that is at least 5% of the thickness of the sheet of plastic material, more preferably at least 10% of the thickness and most preferably at least 20% of the thickness. The grooves define a plurality of sections extending between the first end and the second end of the sheet of plastic material. The sections include a first top section, a first side section, a base section, a second side section and a second top section. The sheet of plastic material can have one or more openings in the first and second side sections.

The first notch is located in the first top section and the second notch is correspondingly located in the second top section. The one or more catches extend from the exterior surface of the first top section and the one or more apertures are located in the second top section. The catches and apertures are correspondingly located so that, when the tag is assembled, the catches are aligned with and received by the apertures. Preferably, the first notch is disposed between two catches extending from the exterior surface of the first top section and the second notch is disposed between two apertures in the second top section. The electronic security device can be installed in a pocket on the interior surface of the base section and can be a radio frequency identification (RFID) tag or electronic article surveillance (EAS) tag. The tag can also have a hook secured to the exterior surface of the body for attachment to a rack or sales display.

The tag is assembled by folding the interior surfaces of the first and second side sections inwardly along the grooves that define the base section so that the side sections are substantially parallel. The first top section is then folded inwardly along the groove between the first top section and the first side section so that the first top section is substantially parallel to the base section. The second top section is folded inwardly along the groove between the second top section and the second side section so that the second top section is substantially parallel to the base section. The first and second top sections overlap so that the one or more apertures fixedly receive the one or more catches to secure the tag in a closed position. The plurality of sections defines an interior and a pair of opposing open ends and is adapted for enclosing the circuit breaker. The notches in the first and second top sections form an opening, which is adapted for receiving the circuit breaker switch.

BRIEF DESCRIPTION OF THE FIGURES

The preferred embodiments of the tag for a circuit breaker, as well as other objects, features and advantages of this invention, will be apparent from the accompanying drawings wherein.

DETAILED DESCRIPTION OF THE INVENTION

The tag is attached to a circuit breaker to provide identification and security. Typically, a circuit breaker has a rectangular block shape with opposing, substantially flat side walls, end walls and top and bottom walls, but no apertures that can be used as an attachment point for a tag. The top wall generally has a switch for resetting the circuit breaker after it trips. Due to its structure, it is difficult to attach a tag to a circuit breaker without using an adhesive, which can be troublesome for the purchaser to completely remove. To overcome these problems, the tag of the present invention wraps around the top, bottom and sides of the circuit breaker and is secured in place by one or more catches and notches in the two top sections that capture the circuit breaker switch. The tag is constructed from a plastic material, such as polypropylene, polyethylene or polyvinyl chloride. However, other types of plastic materials can be used and the plastic material used does not limit the invention. Placement of an electronic security device, such as a radio frequency identification (RFID) tag or electronic article surveillance (EAS) tag, between the tag and the circuit breaker provides security and allows the circuit breaker to be easily identified.

Figure 1:
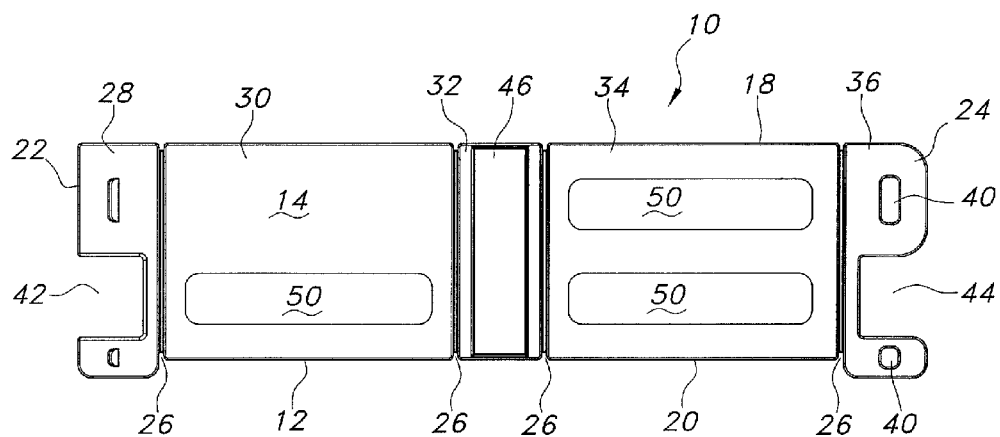
FIG. 1 is a plan view of the interior surface of an embodiment of the tag.
Figure 2:
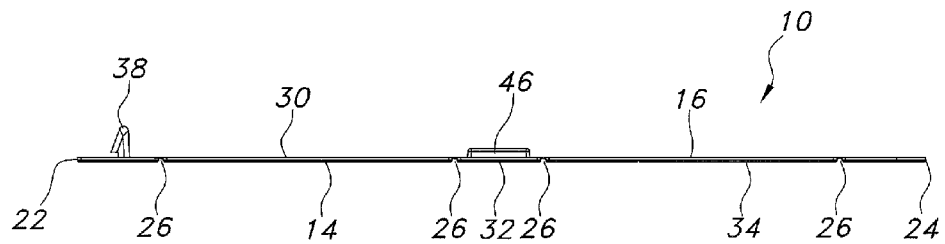
FIG. 2 is a side view of the tag shown in FIG. 1.
Figure 3:
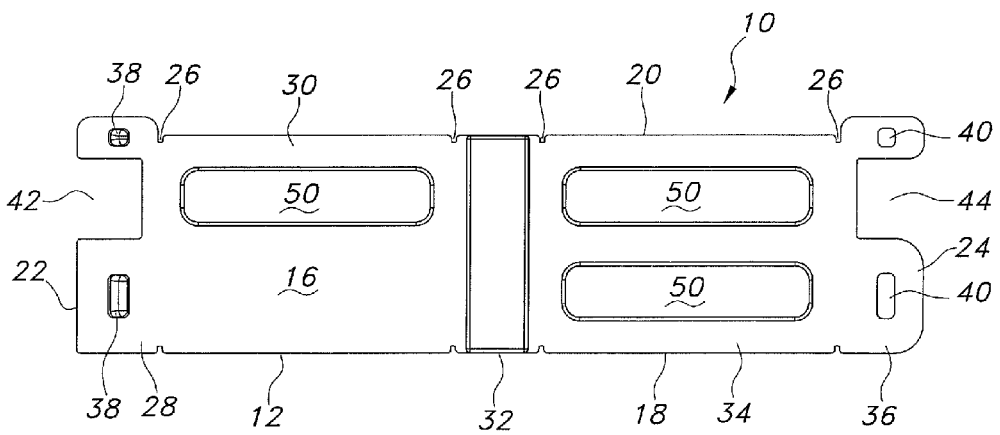
FIG. 3 is a plan view of the exterior surface of the tag shown in FIG. 1.

The tag is now described in more detail with respect to the drawings. FIGS. 1-3 show the tag 10 before it is attached to a circuit breaker (90—see FIG. 5). FIG. 1 shows the interior surface 12 of the tag 10 which has a body 12 formed from a sheet of plastic material. The body 12 has an interior surface 14, an exterior surface 16 (FIG. 3), a first side edge 18, a second side edge 20, a first end 22 and a second end 24. A plurality of parallel grooves 26 extends between the first and second side edges 18, 20. The grooves 26 define a first top section 28, a first side section 30, a base section 32, a second side section 34 and a second top section 36, which are sequentially formed between the first end 22 and the second end 24. The grooves 26 are sized to allow flexing and bending of the adjoining sections 28, 30, 32, 34, 36 of up to at least about 90 degrees. The tag 10 also includes one or more catches 38 extending from the exterior surface 16 of the first top section 28 and one or more apertures 40 in the second top section 36. The location of the one or more apertures 40 corresponds to the location of the one or more catches 38. The catches 38 and apertures 40 are sized so that the catches 38 can be inserted through the apertures 40 by applying a force and cannot be easily withdrawn without the application of a force in the opposite direction. In preferred embodiments, the catches 38 have to be broken-off in order to access the circuit breaker 90. The body 12 of the tag 10 also has a first notch 42 in the first top section 28 and a second notch 44 in the second top section 36, which are correspondingly located.

FIG. 2 shows a pocket 46 for an electronic security device 48, which is formed on the interior surface 14 of the base section 32. When the tag 10 is attached to a circuit breaker 90 (FIG. 7), the security device 48 is positioned in the pocket 46 between the base section 32 and the bottom wall 92 of the circuit breaker 90. FIG. 2 also shows the catch 38 extending from the exterior surface 20 of the body 12 on the same side of the body 12 as the back side of the pocket 46 for the security device 48.

FIG. 3 shows the exterior surface 16 of the body 12, which can also have a plurality of openings 50. These openings 50 allow the circuit breaker 90 to be viewed through the tag 10 and also make the tag 10 more flexible and easier to attach to the circuit breaker 90.

Figure 4:
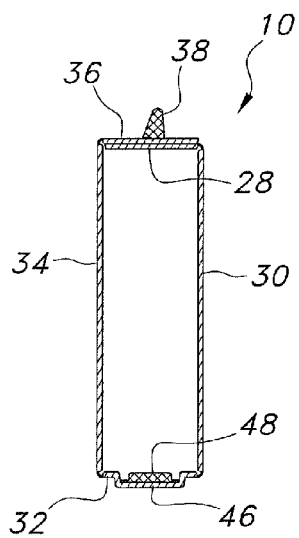
FIG. 4 is a cross-sectional view of the tag shown in FIG. 1 after the sections are folded together and the catch is engaged.

FIG. 4 shows a cross-sectional view of an assembled tag 10 with the overlapping top sections 28, 36 connected by the catch 38. The security device 48 is installed in the pocket 46 in the base section 32.

Figure 5:
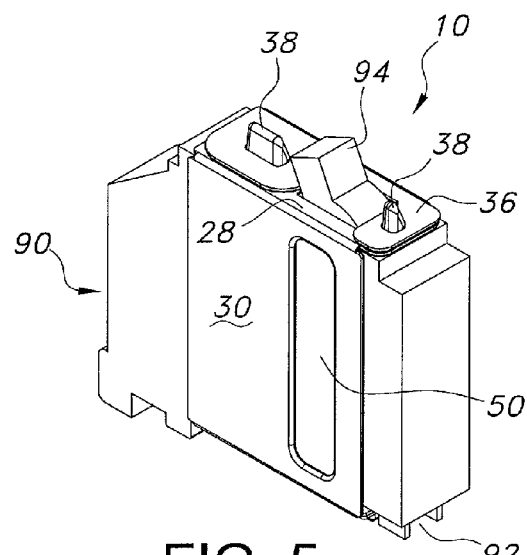
FIG. 5 is a perspective view of the tag shown in FIG. 1 secured to a circuit breaker.

FIGS. 5-9 show the tag 10 attached to a circuit breaker 90. FIG. 5 illustrates how the tag 10 is attached to the circuit breaker 90 by folding the interior surfaces of the first and second side sections 30, 34 inwardly along the grooves 26 on either side of the base section 32 so that the side sections 30, 34 are substantially parallel. The first top section 28 is folded inwardly along the groove 26 between the first top section 28 and the first side section 30 so that it is substantially parallel to the base section 32. The second top section 36 is then folded inwardly along the groove 26 between the second top section 36 and the second side section 34 so that the apertures 40 fixedly receive the catches 38 to secure the tag 10 in a closed position. Once the catches 38 are locked in the apertures 40, they are preferably tamperproof and must be cut off by the user. After the tag 10 is installed on the circuit breaker 90, the exterior surface 16 is substantially smooth for increased strength and aesthetics.

Figure 6:
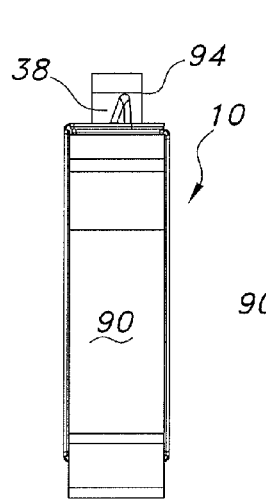
FIG. 6 is a view of the first end of the tag and circuit breaker shown in FIG. 5.
Figure 7:
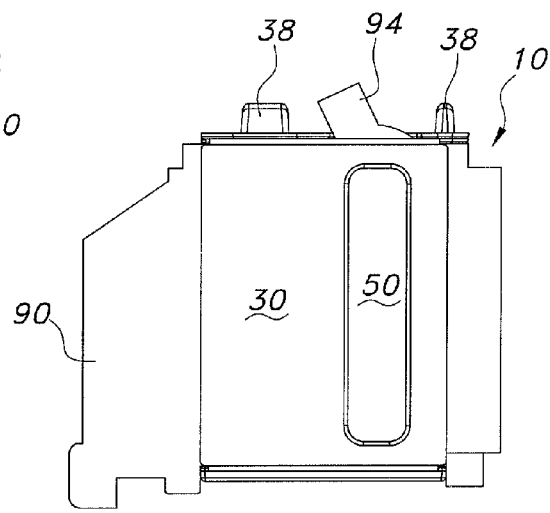
FIG. 7 is a side view of the tag and circuit breaker shown in FIG. 5.
Figure 8:
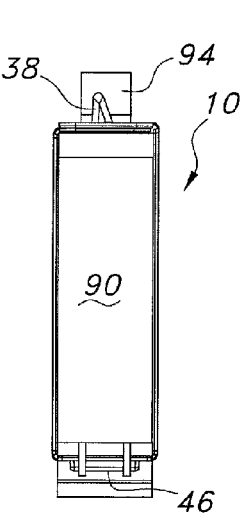
FIG. 8 is a view of the second end of the tag and circuit breaker shown in FIG. 5.
Figure 9:
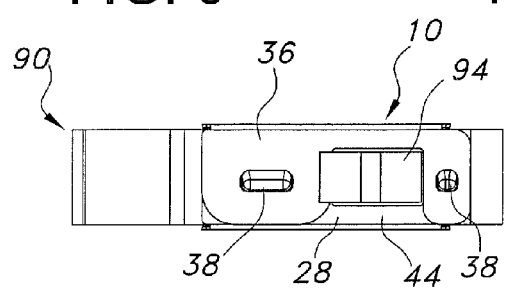
FIG. 9 is a top view of the tag and circuit breaker shown in FIG. 5.
Figure 10:
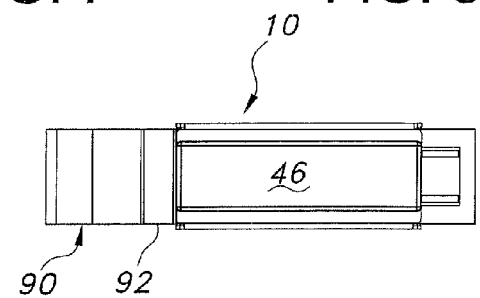
FIG. 10 is a bottom view of the tag and circuit breaker shown in FIG. 5.

FIG. 6 shows how the tag 10 fits snugly around the circuit breaker 90 and FIG. 7 shows how the circuit breaker 90 can be viewed through the opening 50 in the first side section 30. FIG. 8 shows the pocket 46 containing the security device 48 positioned so that the security device 48 is between the bottom wall 92 of the circuit breaker 90 and the base section 32 of the tag 10. FIG. 9 illustrates how the notches 44 (42 not shown) in the top sections 28, 36 receive the switch 94 on the circuit breaker 90. This arrangement prevents the tag 10 from sliding off the circuit breaker 90.

Figure 11:
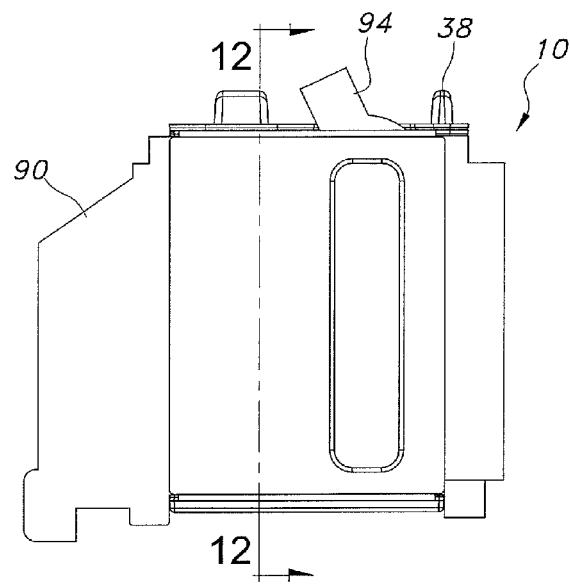
FIG. 11 is a side view of the tag and circuit breaker shown in FIG. 5.
Figure 12:
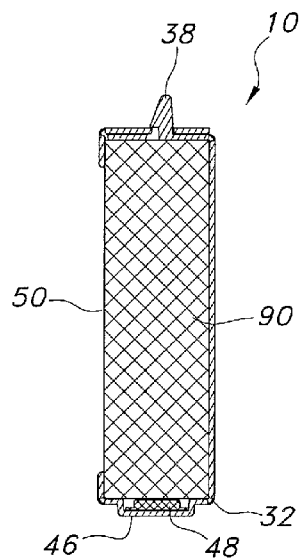
FIG. 12 is a sectional view of the tag and circuit breaker shown in FIG. 11.
Figure 13:
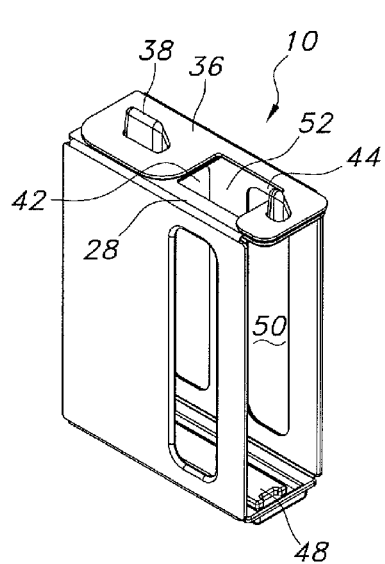
FIG. 13 is a perspective view of the tag shown in FIG. 1 in a closed position.
Figure 14:
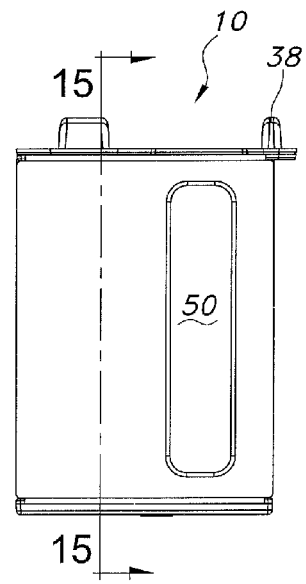
FIG. 14 is a side view of the tag shown in FIG. 1 in a closed position.
Figure 15:
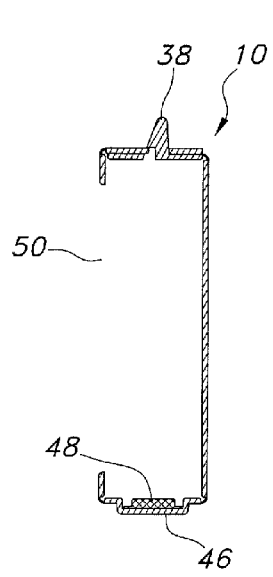
FIG. 15 is a sectional view of the tag shown in FIG. 14.

FIGS. 11 and 12 show side and sectional views, respectively, of a tag 10 attached to a circuit breaker 90 with a security device 48 in the pocket 46 of the bottom section 32 of the tag 10. FIGS. 13, 14 and 15 show perspective, side and sectional views, respectively, of a tag 10 with a security device 48 in the closed position. FIG. 13 illustrates how the notches 42, 44 in the first and second top sections 28, 36 form an opening 52 for receiving the switch 94 on the top of the circuit breaker 90.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. A tag for attachment to a circuit breaker having a substantially rectangular body with a top side, a bottom side, two side walls, two opposing ends, and a switch extending from the top side, the tag comprising:

a sheet of plastic material having an interior surface, an exterior surface, a first side edge, a second side edge, a first end and a second end;

a plurality of parallel grooves extending between the first and second side edges, wherein the grooves define a plurality of sections comprising a first top section, a first side section, a base section, a second side section and a second top section between the first end and the second end; and a first notch in the first top section and a second notch in the second top section, wherein the notches are correspondingly located;

wherein the interior surfaces of the first and second side sections are folded inwardly along the grooves that define the base section so that the side sections are substantially parallel, wherein the first top section and the second top section are folded inwardly along the grooves between the first top section and the first side section and the second top section and the second side section, respectively, so that the first and second top sections are substantially parallel to the base, wherein the plurality of sections define an interior and a pair of opposing open ends and is adapted for enclosing the circuit breaker, and wherein the notches in the first and second top sections form an opening, which is adapted for receiving the switch.

2. The tag for attachment to a circuit breaker according to claim 1 further comprising one or more catches extending from the exterior surface of the first top section and one or more apertures in the second top section, wherein the one or more apertures fixedly receive the one or more catches to secure the tag in a closed position.

3. The tag for attachment to a circuit breaker according to claim 1 further comprising an electronic security device.

4. The tag for attachment to a circuit breaker according to claim 3, wherein the electronic security device is installed in a pocket on the interior surface of the base section.

5. The tag for attachment to a circuit breaker according to claim 1 further comprising one or more openings in the first and second side sections.

6. The tag for attachment to a circuit breaker according to claim 2, wherein the first notch is disposed between two catches extending from the exterior surface of the first top section and the second notch is disposed between two apertures in the second top section.

7. The tag for attachment to a circuit breaker according to claim 1, wherein the sheet of plastic material has a thickness and each of the plurality of parallel grooves has a depth that is at least 10% of the thickness.

8. The tag for attachment to a circuit breaker according to claim 1, wherein the sheet of plastic material is substantially rectangular and substantially flat.

9. A tag for attachment to a circuit breaker having a substantially rectangular body with a top side, a bottom side, two side walls, two opposing ends, and a switch extending from the top side, the tag comprising:
  a sheet of plastic material having an interior surface, an exterior surface, a first side edge, a second side edge, a first end and a second end;
  a plurality of parallel grooves extending between the first and second side edges, wherein the grooves define a plurality of sections comprising a first top section, a first side section, a base section, a second side section and a second top section between the first end and the second end;
  a first notch in the first top section and a second notch in the second top section, wherein the notches are correspondingly located;
  one or more catches extending from the exterior surface of the first top section and one or more apertures in the second top section; and
  an electronic security device,
  wherein the interior surfaces of the first and second side sections are folded inwardly along the grooves that define the base section so that the side sections are substantially parallel, wherein the first top section and the second top section are folded inwardly along the grooves between the first top section and the first side section and the second top section and the second side section, respectively, so that the first and second top sections are substantially parallel to the base, wherein the plurality of sections define an interior and a pair of opposing open ends and is adapted for enclosing the circuit breaker, wherein the notches in the first and second top sections form an opening, which is adapted for receiving the switch, and wherein the one or more apertures fixedly receive the one or more catches to secure the tag in a closed position.

10. The tag for attachment to a circuit breaker according to claim 9, wherein the electronic security device is installed in a pocket on the interior surface of the base section.

11. The tag for attachment to a circuit breaker according to claim 9 further comprising one or more openings in the first and second side sections.

12. The tag for attachment to a circuit breaker according to claim 9, wherein the first notch is disposed between two catches extending from the exterior surface of the first top section and the second notch is disposed between two apertures in the second top section.

13. The tag for attachment to a circuit breaker according to claim 9, wherein the sheet of plastic material has a thickness and each of the plurality of parallel grooves has a depth that is at least 10% of the thickness.

14. The tag for attachment to a circuit breaker according to claim 9, wherein the sheet of plastic material is substantially rectangular and substantially flat.

15. A tag for attachment to a circuit breaker having a substantially rectangular body with a top side, a bottom side, two side walls, two opposing ends, and a switch extending from the top side, the tag comprising:
  a sheet of plastic material having a thickness, an interior surface, an exterior surface, a first side edge, a second side edge, a first end and a second end;
  a plurality of parallel grooves extending between the first and second side edges, wherein each of the plurality of parallel grooves has a depth that is at least 10% of the thickness of the sheet of plastic material, and wherein the grooves define a plurality of sections comprising a first top section, a first side section, a base section, a second side section and a second top section between the first end and the second end;
  a first notch in the first top section and a second notch in the second top section, wherein the notches are correspondingly located;
  one or more catches extending from the exterior surface of the first top section and one or more apertures in the second top section; and
  an electronic security device,
  wherein the interior surfaces of the first and second side sections are folded inwardly along the grooves that define the base section so that the side sections are substantially parallel, wherein the first top section and the second top section are folded inwardly along the grooves between the first top section and the first side section and the second top section and the second side section, respectively, so that the first and second top sections are substantially parallel to the base, wherein the plurality of sections define an interior and a pair of opposing open ends and is adapted for enclosing the circuit breaker, wherein the notches in the first and second top sections form an opening, which is adapted for receiving the switch, and wherein the one or more apertures fixedly receive the one or more catches to secure the tag in a closed position.

16. The tag for attachment to a circuit breaker according to claim 15, wherein the electronic security device is installed in a pocket on the interior surface of the base section.

17. The tag for attachment to a circuit breaker according to claim 15 further comprising one or more openings in the first and second side sections.

18. The tag for attachment to a circuit breaker according to claim 15, wherein the first notch is disposed between two catches extending from the exterior surface of the first top section and the second notch is disposed between two apertures in the second top section.

19. The tag for attachment to a circuit breaker according to claim 15, wherein the sheet of plastic material is substantially rectangular and substantially flat.

\* \* \* \* \*